Feb. 25, 1969     E. KLEIN     3,430,054

APPARATUS FOR MODULATING DIRECT VOLTAGES AND CURRENTS

Filed Oct. 22, 1965     Sheet 1 of 2

United States Patent Office 3,430,054
Patented Feb. 25, 1969

3,430,054
APPARATUS FOR MODULATING DIRECT
VOLTAGES AND CURRENTS
Erwin Klein, Erlangen, Germany, assignor to Siemens
Aktiengesellschaft, Erlangen, Germany
Filed Oct. 22, 1965, Ser. No. 500,934
Claims priority, application Germany, Jan. 15, 1965,
S 95,064
U.S. Cl. 250—217             6 Claims
Int. Cl. G02f 1/28; H01l 15/06; H01c 7/08

ABSTRACT OF THE DISCLOSURE

A photoresistor in a signal receiving circuit is mounted in an opening of a carrier plate of sheet metal and modulates the signals by radiation-responsive resistance variations. The photoresistor comprises a resistor member joined in face-to-face relation with the diode member of a luminescence diode. The luminescence diode and the photoresistor are mechanically joined in a single structural unit and are in optical connection. A periodic-current supply to the luminescence diode periodically varies the radiation issuing therefrom to the photoresistor. An electrical insulating layer interposed between, and separating, the luminescence diode and the carrier plate and photoresistor, comprises material permeable to radiation from the diode member.

Description of the invention

My invention relates to devices for modulating or chopping direct voltages and currents.

The measuring of very small direct voltages and currents poses the difficult problem of providing stable direct-voltage amplifiers for augmenting the signals to be measured. To avoid this problem, resort has been taken in many cases to periodically interrupting the direct voltage and to using the resulting alternating voltage signals for controlling an alternating-voltage amplifier. A phase-sensitive rectification then takes care of securing the desired selective amplification of the input voltage.

The choppers and modulators heretofore known have the disadvantage that the modulation frequency is upwardly limited. Hence, the number of alternating-current signals per unit time that can be produced by modulation of a direct-current or direct-voltage signal cannot be increased at will. With mechanical choppers, the upper limit frequency is approximately 200 c.p.s. The known contactless modulators, based upon magnetic control of galvanomagnetic resistors, cannot be operated at any desired high frequency because the magnetic induction required for the control of such resistors is inversely proportional to the modulation frequency. The strong magnetic fields that would be needed for modulation at high modulating frequencies, could be achieved only by excessive technological expenditures no longer appropriate for measuring instrumentalities. Due to the upward limitation of the modulation frequency, changes of the direct-voltage signal to be measured can be temporally resolved only within appreciable limitations which, particularly for use of such devices in control or regulating systems, may constitute a considerable deficiency.

It is an object of my invention to provide a device for modulation of direct voltages and direct currents which minimizes or eliminates the above-described shortcomings and disadvantages.

To this end, and in accordance with my invention, I supply the signals to a photoresistor which is in optical communication with luminescence diode whose radiation is applied to the photoresistors; and I excite the luminescence diode by periodic current, preferably alternating current, to periodically vary the electrical conductivity of the resistor. Periodic or alternating currents for energizing the luminescence diode according to the invention are herein understood to be time variable currents, for example sine-wave or rectangular-wave currents or other periodic pulse currents.

The electromagnetic radiation issuing from a luminescence diode follows virtually without inertia the changes of an alternating voltage applied to the diode, the luminescent radiation being generated whenever the alternating voltage stresses the diode in the forward direction. The direct current or voltage to be measured is supplied to an electric measuring or sensing circuit in which the photosensitive resistor is connected. The radiation issuing from the luminescence diode varies the conductivity of this photoresistor, thus effecting the modulation of the signals. The alternating voltage resulting from the modulation may be taken off a load resistor connected in the measuring circuit.

The upper limit frequency of such a modulator is essentially determined by the lifetime of the charge carriers in the photoresistor and can be varied within wide limits by employing a suitable material for the photoresistor.

A modulator according to the invention has the further advantage that photoresistors can be given a considerably more high-ohmic resistance value than for example galvanomagnetic resistors, so that even very slight direct voltages stemming from voltage sources of high internal resistance become amenable to being accurately measured. Particularly suitable as materials for the photoresistor are germanium silicon and gallium arsenide. For example, the photoresistor may be made of n-type silicon having a specific resistance of 1000 ohm·cm.

Applicable as luminescence diodes in devices according to the invention are, for example, luminescence diodes of gallium arsenide, gallium phosphide, gallium arsenide-phosphide mixed crystals Ga(As, P) or silicon carbide. In order to have the conductivity of the photoresistor varied by radiation from the luminescence diode, the luminescence diode must consist of a semiconductor material whose width of the forbidden energy band is equal to, or larger than, the width of the forbidden energy band of the photoresistance material. Thus, for example, a luminescence diode of gallium arsenide, having a band width of about 1.35 ev., may be used together with a photoresistor of silicon having a band width of 1.11 ev.

According to another feature of the invention, the modulator may be modified by providing two luminescence diodes in optical communication with a photoresistor. This device permits utilizing both half-waves of the luminescence controlling alternating current for the purpose of modulating the direct-current or direct-volatge signal.

According to still another feature of my invention, one or two luminescence diodes are combined with a photoresistor to constitute a single structural unit. Such units afford securing an optimal optical coupling between luminescence diodes and photoresistor. The structural units also have the advantage of minimized spacial dimensions and can be mounted in a transistor housing of customary shape or size, having, for example, a diameter of 13.2 mm. and a height of 8.2 mm., or a diameter of 8.5 and a height of 6.7 mm. In such a unit, one or two luminescence diodes, according to a further feature of the invention, are preferably placed upon the photoresistor in such a manner that substantially the entire surface of the photoresistor is illuminated by the radiation from the luminescence diodes. The diodes are mechanically joined with the photoresistor but are electrically insulated therefrom by a suitable insulation premeable to the radiation, for example a radiation-transparent foil of synthetic plastic or by a suitable varnish. The insulating medium preferably should have the same or a similar diffraction index as the material of the luminescence diode so that radiation will pass through the insulation substantially without reflection.

The invention will be further explained with reference to the accompanying drawings, in which:

FIGS. 1a through 5a are corresponding explanatory graphs.

A device for modulating direct voltages or direct currents according to the invention may be embodied in various electrical circuits. For example, any of the circuits shown in FIGS. 1 through 4 is suitable for modulation of direct voltages. The so-called measuring circuit 1, identical in all four embodiments, comprises a photoresistor 2 and a load resistor 3 in series. The direct voltage to be measured is applied between terminals 4. The output voltage produced by modulation of the signal voltage is taken off the terminals of the load resistor 3. By different control of the luminescence diodes, different modulating effects are achieved in the respective circuits of FIGS. 1 to 4.

Figure 1:
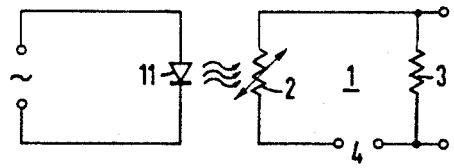
FIGS. 1 to 5 show schematically different embodiments of circuit diagrams of devices according to the invention by way of example.
Figure 1A:
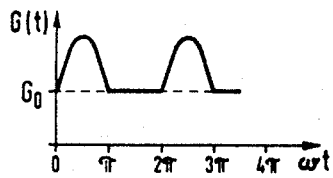

The simplest circuit connection is the one shown in FIG. 1. The luminescence diode 11 radiates only during each second half-wave of the applied alternating voltage, that is only as long as the alternating voltage is poled in the forward direction of the diode. The electrical conductivity $G(t)$ of the photoresistor 2 then increases from the value $G_0$ until the alternating voltage reaches its maximum, and thereafter decreases back to the value $G_0$. This is apparent from the coordinate diagram of FIG. 1a where the abscissa denotes time and the ordinate denotes conductivity. Denoted by $G_0$ is the electrical conductivity of the photoresistor 2 when the latter is not exposed to radiation. The described operation is repeated each half-wave during which the luminescence diode 11 is poled in the forward direction. The direct-voltage signal at terminals 4 becomes modulated in accordance with the variation in electrical conductance of the photoresistor 2. The resulting alternating voltage appears across the output terminals between which the resistor 3 is connected.

Figure 2:
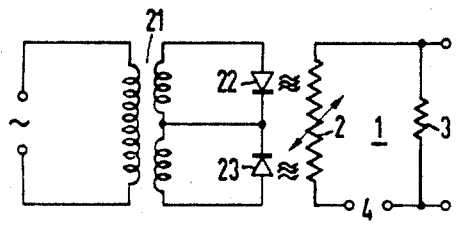
Figure 2A:
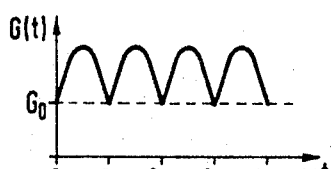

The embodiment shown in FIG. 2 comprises two luminescence diodes 22 and 23 and affords utilizing both half-waves of the luminescence-controlling alternating voltage for modulation of direct-voltage signal. The controlling alternating voltage is supplied to a transformer 21 whose secondary winding has a mid-tap. The luminescence diodes 22 and 23 are connected between the mid-tap and the respective ends of the secondary winding in series-opposed polarity so that during each half-wave of the controlling alternating current one of the respective luminescence diodes is poled in the forward direction and issues radiation. Both diodes are arranged in illuminating relation to the photoresistor 2. The variation in electrical conductivity $G(t)$ of the photoresistor 2, effecting the modulation of the direct-voltage signal, is represented in the diagram shown in FIG. 2a. The variation in conductivity during each individual half-wave of the controlling alternating voltage is caused by radiation of one of the respective diodes.

Figure 3:
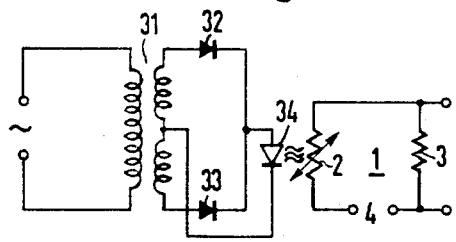
Figure 3A:
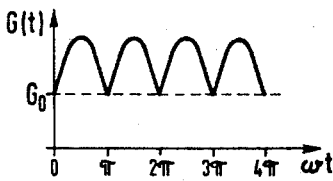

The embodiment shown in FIG. 3 comprises two rectifiers and one luminescence diode which likewise permit utilizing both half-waves of the controlling alternating voltage for modulation of the direct voltage to be measured. The controlling alternating voltage is supplied through a transformer 31 with a mid-tapped secondary winding. Two rectifier diodes 32 and 33 and a luminescence diode 34 are connected in the secondary circuit to form a full-wave rectifying network. During one half-wave of the controlling alternating voltage, the diode 32 is poled in the forward direction so that current passes through rectifier diode 32 and luminescence diode 34, whereas during the following half-wave the other rectifier diode 33 is poled in the forward direction so that current will flow through the latter diode and again through the luminescence diode 34. As long as one of the rectifier diodes 32, 33 is poled in the forward direction, the other rectifier diode is poled in the blocking direction. The luminescence diode 34 issues radiation during each half-wave of the controlling alternating voltage. The resulting variation in electrical conductivity $G(t)$ is represented in the diagram of FIG. 3a and corresponds to that obtained with the embodiment of FIG. 2.

Circuits according to FIGS. 2 and 3 are preferably used in cases where a highest feasible modulation frequency is desired.

Figure 4:
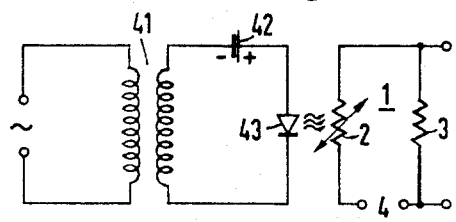
Figure 4A:
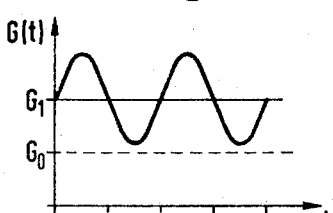

The embodiment shown in FIG. 4 provides a substantially sinusoidal modulation of the direct voltage. The controlling alternating voltage is supplied through a transformer 41 in whose secondary circuit a direct voltage source 42 and a luminescence diode 43 are connected in series. The luminescence diode 43 is biased in the forward direction by the direct voltage from the source 42. Consequently, this diode also issues radiation when no controlling alternating voltage is applied or when the controlling alternating voltage passes through zero. By superposition of the direct current flowing through the luminescence diode 43 on the one hand, and the controlling alternating current on the other hand, the radiation from the luminescence diode is increased during one half-wave of the alternating voltage and decreased during the next following half-wave. The variation in electrical conductance $G(t)$ of the photoresistor 2 by varing radiation from the luminescence diode is represented in FIG. 4a. The unexposed photoresistor has an electrical conductivity $G_0$. The radiotion produced by the direct current flowing in the luminescence diode increases the conductivity to the value $G_1$. When superimposing an alternating current upon this direct current, the electrical conductivity of the photoresistor changes to the illustrated substantially sinusoidal shape. In order to thus produce a sinusoidal modulation in electrical conductivity of the photoresistor, the voltage of the source 42 must be higher than the maximum of the controlling alternating voltage.

Figure 5:
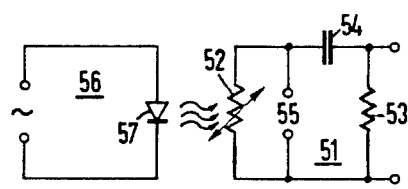
Figure 5A:
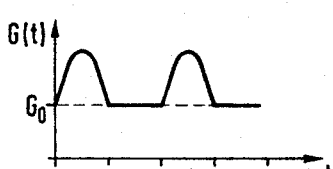

The device illustrated in FIG. 5 is applicable with a simple circuit for modulating a direct current. It is presumed that the internal resistance of the direct-current source is very much larger than the dark resistance $1/G_0$ of the photoresistor. The measuring circuit 51 comprises a photoresistor 52, a load resistor 53 and a capacitor 54. The direct current to be modulated is supplied through terminals 55 parallel to the photoresistor 52. A capacitor 54 isolates the load resistor 53 with respect to direct current from the remainder of the measuring circuit. As a result, the entire direct voltage produced by the direct-current signal at 55 is impressed upon the photoresistor 52. The alternating-current signal produced by modulation of the direct current to be measured, can be taken off the terminals of the load resistor 53. With this circuit, the modulation is effected by radiation issuing from the luminescence diode 57 during those half-waves of the controlling alternating voltage that stress the diode 57 in the forward direction. The resulting variation in electrical conductivity G(t) of the photoresistor 52 is represented in FIG. 5a.

In lieu of the control circuit 56 employed in the device according to FIG. 5, various other control circuits are applicable, for example those exemplified in FIGS. 2 to 4. The modulation output waves obtainable with these control circuits correspond to the respective changes in electrical conductivity of the photoresistor represented in respective FIGS. 2a to 4a.

The embodiment of a modulating device according to the invention illustrated in FIGS. 6 and 6a comprises a luminescence diode and a photoresistor joined to a single structural unit which is designed as follows.

A luminescence diode 61 is alloyed onto a rectangular sheet-metal carrier plate 62 of a material having approximately the same thermal coefficient of expansion as the material of the luminescence diode. Suitable for a gallium arsenide luminescence diode, for example, is a sheet-metal carrier consisting of iron-nickel alloy or molybdenum. The carrier plate 62 has the shape of a frame with a rectangular opening so that only the marginal areas of the luminescence diode are covered by sheet-metal to permit substantially all of the luminescent radiation to pass through the frame opening. Mounted in the opening of plate 62 is a photoresistor 63 of rectangular shape dimensioned to substantially fill the entire opening. The photoresistor 63 is electrically insulated from the luminescence diode 61 and the carrier plate 62 by an insulating layer 65 permeable to radiation from the diode. This layer consists of a foil of synthetic plastic, for example.

The photoresistor 63 is provided with terminals 64 which are located along the respective short edges of the rectangular resistor because only the portion of the photoresistor located between these terminals can be utilized for modulating the direct-current or voltage signals. The photoresistor 63 is fastened in the opening of the carrier plate 62 by mechanical means which in the illustrated embodiment are constituted by threads 66 of nylon or Perlon joined by rivets or screws 67 with the carrier plate 62. The leads 69 for supplying the direct current or voltage signals to be controlled are joined with the terminals 64 of the photoresistor 63, preferably by soldering. The controlling alternating voltage is supplied to the luminescence diode 61 through a contact 68. Used as the second contact of the diode is the metal plate 62 to which the luminescence diode is alloy-bonded. The p-n junction of the luminescence diode extends in a plane situated between the contact 68 and the plate 62 and extending parallel to the plate 62, this junction being schematically indicated by a vertical broken line in FIG. 6.

Figure 7:
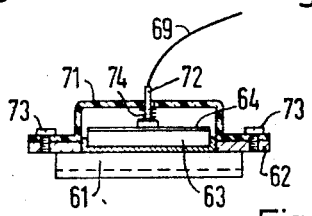
FIG. 7 shows in cross-section another embodiment of a unit comprising a luminescence diode joined with a photoresistor.

The contacting and fastening of the photoresistor 63 may also be effected in other ways, a further example being shown in FIG. 7. The photoresistor 63 is fastened in the opening of the metallic carrier plate 62 with the aid of a bracket 71 of synthetic plastic which is joined with the plate 62 by screws 73. Mounted on the insulating bracket 71 is a pressure contact 72 which passes through a hole in the bracket 71 and is pressed by a spring 74 upon the electrode 64 of the photoresistor 63, thus securing an electrical connection of the photoresistor 63 with a current supply lead 69. With this type of fastening and contacting, an insulating bracket 71 with a pressure contact 72 must be attached to the carrier plate above each of the two terminals 64 of the photoresistor 63.

The fastening and contacting of the photoresistor 63 however may also be effected by employing the insulating bracket only for fastening the photoresistor and joining the current supply leads directly with the terminals on the photoresistor such as by soldering.

When using varnishes, for example silicone varnish, as intermediate insulating layer, additional fastening means may be dispensed with, since then the photoresistor may be cemented to the luminescence diode with the aid of the varnish.

Figure 6:
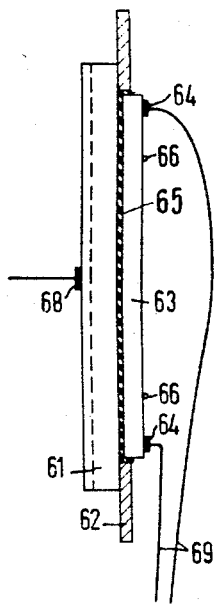
FIG. 6 is a lateral elevation, partly in section, of an embodiment of the invention consisting of a single structural unit which contains a luminescence diode joined with a photoresistor.
Figure 6A:
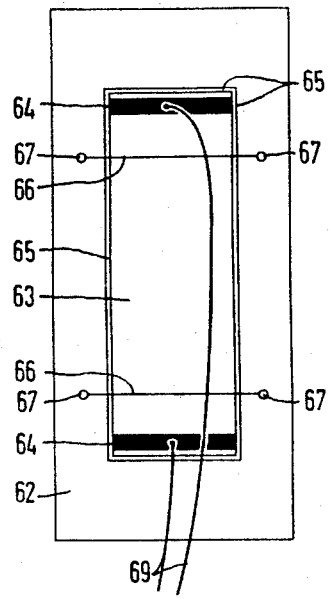
FIG. 6a is a plan view of the device according to FIG. 6.

Described presently by way of sample are numerical data of a device made according to FIGS. 6 and 6a, which has been found particularly advantageous for modulation of direct voltages.

The device was equipped with a gallium arsenide luminescence diode, the doped n-conducting side of the diode crystal was alloyed onto a sheet-metal carrier plate of iron-nickel alloy resulting in a barrier-free junction between the carrier plate and the n-type region of the diode. The carrier plate was about 6 mm. long, 4 mm. wide and approximately 300μ thick. The rectangular opening in the plate was 4 mm. long and 2 mm. wide. The outer dimensions of the gallium arsenide luminescence diode were slightly smaller than those of the carrier plate and the thickness of the diode was likewise approximately 300μ. Fastened in the opening of the carrier plate was a photoresistor of n-type silicon having a specific resistance of about 1000 ohm·cm. unexposed. The photoresistor was slightly smaller than the opening of the carrier plate and its thickness was about 400μ. The photoresistor had its ends provided with iron-alloyed barrier-free terminal electrodes of a gold-antimony alloy at the side facing away from the luminescence diode. The current supply leads were soldered into these terminal electrodes. A radiation-transparent foil of synthetic plastic was placed between the photoresistor and the luminescence diode to insulate the photoresistor from the diode and the carrier plate. Used as insulating foil was a Mylar foil. For pretection from ingress of light from the outside the components were mounted in a transistor housing from which only the electric leads extended to the outside.

In the embodiment shown in FIG. 8, two luminescence diodes and a photoresistor are joined to a single unit as follows. The two diodes 81 and 82 are alloyed onto respective carrier plates 83 and 84, each provided with an opening. The two luminescence diodes are placed upon a photoresistor 85 in such a manner that the resistor is located in the openings of both carrier plates. Insulating layers 86 and 87 transparent to the radiation are placed into the openings and electrically insulate the photoresistor 85 from the luminescence diodes 81, 82 and the carrier plates 83, 84. The elongated rectangular photoresistor 85 is provided with alloy-bonded terminals 88 and 89 at its respective ends, and current leads are soldered to the respective terminals. Alternating control current is supplied to the luminescence diodes through respective alloy-bonded contacts and the carrier plates. A mechanical connection between the individual parts of the structural unit is effected by means of screws or rivets which hold the carrier sheets 83 and 84 together.

Figure 8:
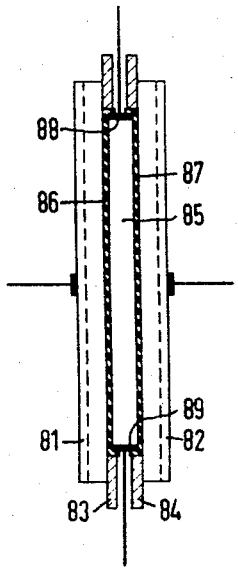
FIG. 8 shows schematically and partly in longitudinal section an embodiment of a device according to the invention comprising a photoresistor with two luminescence diodes.

Devices of the type shown in FIG. 8, comprising two luminescence diodes and one photoresistor, are particularly well suitable for use in circuits which, as exemplified in FIG. 2, utilize both half-waves of the controlling alternating voltage for modulating the direct voltage signal.

Figure 9:
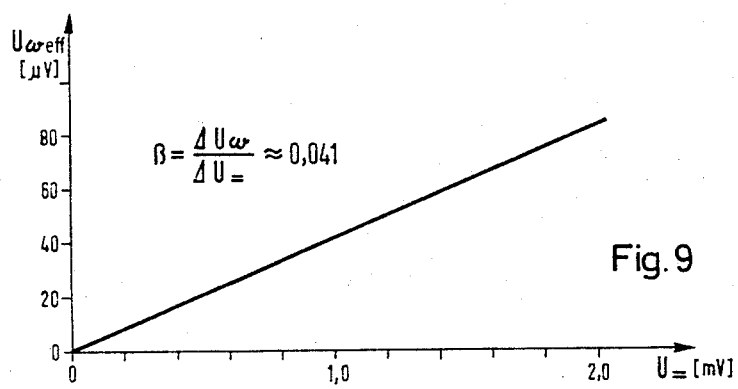
FIG. 9 is an explanatory graph, showing the operating characteristic of a modulator device according to the invention.

FIG. 9 shows a characteristic of a modulator device according to the invention. This characteristic was measured with a circuit as shown in FIG. 1. Indicated on the abscissa is the direct voltage applied between the terminals 4. The ordinate indicates the effective alternating voltage of the fundamental wave taken off the load-resistor terminals. The load resistor 3 had a resistance of 200 kilohm. Used as photoresistor 2 was n-type silicon having a specific resistance of 1000 ohm·cm. The radiation source was a gallium arsenide luminescence diode operated at normal room temperature. The controlling alternating voltage had a frequency of 1 K c.p.s. The peak value of the current amplitude passing through the diode was 300 ma. When measuring the characteristic, only one-third of the total surface area of the photoresistor was illuminated by the radiation from the luminescence diode. This resulted in a transfer factor $\beta=0.041$. This factor is equal to the inclination of the characteristic. With a complete illumination of the photoresistor, the factor $\beta$ can be increased to the value of 0.1 under the same control conditions of the photoresistor.

Devices according to the invention for modulating small direct current and direct voltage signals can be modified in various ways. For example, the devices shown in FIGS. 6, 6a and 7 may be provided with circular semiconductor bodies instead of the rectangular bodies shown. With a circular photoresistor, one contact is preferably mounted in the center on one side, and the other contact forms a ring about the periphery.

It is sometimes desirable for modulators that the control circuit and the measuring circuit be remote from each other. This is particularly so if the two circuits are on different electrical potentials and the potential difference between them is very high. In such cases, too, a device according to the invention is of advantage because the radiation issuing from the luminescence diode in the control circuit can be readily supplied by means of an optical conductor, which may be formed, for example, of a bunch of optical glass fibers, across relatively large distances to the photoresistor of the measuring circuit. By adapting the cross-section of the optical conductor to the surface of the photoresistor, a substantially complete illumination of the photoresistor by the radiation from the luminescence diode can then also be secured, in order to achieve a high transfer factor. The complete isolation between control circuit and measuring circuit, of course, is of considerable advantage in numerous other cases where the respective voltages of these circuits should be kept separate from each other.

I claim:

1. A modulator for direct voltage signals comprising a signal receiving circuit;
   luminescence diode means, said luminescence diode means comprising at least one diode member;
   a carrier plate of sheet metal having an opening;
   photoresistor means in said circuit and mounted in the opening of said carrier plate for modulating the signals by radiation-responsive resistance variations, said photoresistor means comprising a resistor member joined in face-to-face relation with said diode member, said luminescence diode means and said photoresistor means being mechanically joined with each other and forming together a single structural unit, said luminescence diode means being in optical connection with said photoresistor means;
   periodic-current supply means connected to said luminescence diode means for periodically varying the radiation issuing therefrom to said photoresistor means; and
   an electrical insulating layer interposed between and separating said luminescence diode means and said carrier plate and said photoresistor means, said insulating layer comprising material permeable to radiation from the diode member of said luminescence diode means.

2. A modulator according to claim 1, comprising insulating threads of synthetic plastic fastened to said carrier plate and holding said photoresistor means in said opening.

3. A modulator according to claim 1, comprising fastening brackets of synthetic plastic secured to said carrier plate and holding said photoresistor means in said opening.

4. A modulator according to claim 3, comprising a pressure contact resiliently mounted on each of said brackets and engageable with said photoresistor means for electrically connecting it in said circuit.

5. A modulator for direct voltage signals comprising two carrier plates of metal having respective frame openings;
   a signal receiving circuit;
   luminescence diode means having two diodes;
   photoresistor means in said circuit for modulating the signals by radiation-responsive resistance variations, said photoresistor means comprising one resistor member having two opposite flat sides, said luminescence diode means being in optical connection with said photoresistor means, the two diodes of said luminescence diode means being marginally fastened to said respective carrier plates and situated in face-to-face relation to said resistor member on said opposite flat sides thereof with said member located in the frame openings of both said plates;
   periodic-current supply means connected to said luminescence diode means for periodically varying the radiation issuing therefrom to said photoresistor means;
   electrical insulating layers separating said resistor member from said diodes and said plates, said layers being permeable to radiation from said diodes; and
   mechanical means fastening said two carrier plates to each other.

6. In a modulator according to claim 5, said luminescence diodes forming an alloy bond with said respective carrier plates.

References Cited

UNITED STATES PATENTS

| 2,302,049 | 11/1942 | Parker et al. | 250—217 X |
| 2,432,104 | 12/1947 | Thomson | 250—217 |
| 3,014,135 | 12/1961 | Hewlett et al. | 250—217 X |
| 3,304,430 | 2/1967 | Blard et al. | 250—217 |

JAMES W. LAWRENCE, *Primary Examiner.*

R. F. HOSSFELD, *Assistant Examiner.*

U.S. Cl. X.R.

317—234; 313—108